July 25, 1961  W. R. JENKS ET AL  2,993,754
PROCESS FOR PRODUCING ALKALI METAL CYANIDE
Filed Jan. 2, 1958

INVENTORS
WILLIAM R. JENKS
JOHN S. LINDER
BY
ATTORNEY

United States Patent Office 2,993,754
Patented July 25, 1961

2,993,754
PROCESS FOR PRODUCING ALKALI METAL CYANIDE
William R. Jenks and John S. Linder, Memphis, Tenn., assignors to E. I. du Pont de Nemours and Company, Wilmington, Del., a corporation of Delaware
Filed Jan. 2, 1958, Ser. No. 706,733
3 Claims. (Cl. 23—79)

This invention relates to a process and apparatus for preparing salts from hydrocyanic acid, and is more particularly concerned with the production of alkali metal cyanides by the wet process.

Alkali metal cyanides have been produced industrially by both dry and wet processes. In the Castner or dry process ammonia is reacted with a mixture of carbon and metallic sodium at elevated temperature. In a well-known wet process, hydrogen cyanide vapor is neutralized with aqueous alkali metal hydroxide to produce a solution of the desired salt, which is then recovered by crystallization. The hydrogen cyanide required is commercially produced on a large scale by reaction of ammonia with natural gas at a price which favors the wet process. However, economical production of a high quality product comparable to that of the Castner process has encountered difficulties which have been the subject of much research, and numerous proposals for overcoming them appear in the literature, starting as long ago as Roessler U.S. Patent No. 716,350 of December 16, 1902.

One difficulty encountered in the wet process is polymerization of hydrogen cyanide to brown resins which contaminate and discolor the product, and which foul the equipment. Vapor phase polymerization can be prevented by maintaining a trace of sulfur dioxide or other acidic material in the vapor, but this is neutralized as the hydrogen cyanide is mixed with the aqueous alkaline solution. This necessitates a quick and efficient mixing of the hydrogen cyanide with a relatively large volume of alkaline solution, so that the hydrogen cyanide is absorbed and neutralized before polymerization can occur.

Another difficulty is that alkali metal cyanides readily hydrolyze in the presence of water to form hydrogen cyanide and alkali metal formate. The presence of formates is particularly objectionable in certain important uses of the product. This can be substantially prevented by maintaining sufficient excess of alkali metal hydroxide present throughout the process and avoiding solution temperatures above 70° C. However, alkali metal hydroxide is objectionable in the product if more than a slight excess is present. Although pure alkali metal cyanide can be crystallized from solutions containing a considerable excess of alkali metal hydroxide, the separation of mother liquor from the crystals is necessarily incomplete in an economical process.

As discussed in Kremer et al. U.S. Patent No. 2,773,752, issued December 11, 1956, to the assignee of the present application, the concentration of alkali metal hydroxide in the mother liquor in contact with the crystals should not exceed 3% if a satisfactory product is to be produced. Furthermore, this patent teaches that the alkali metal cyanide solution fed to the evaporator-crystallizer should contain only 0.2-1.0% of unneutralized hydroxide, since the concentration increases during evaporation. However, the patent shows that, when a sodium cyanide solution contains such a slight excess of sodium hydroxide, the sodium cyanide decomposes slowly at 60° C., the rate of decomposition is approximately twice as great at 70° C., and is at least seven times as great at 80° C. Therefore, an extremely close control of both concentration and temperature must be maintained, particularly during neutralization of the hydrogen cyanide.

The neutralization of hydrogen cyanide generates considerable heat, not only because of the heat of reaction, but principally because of the latent heat released by the condensing vapor. Provision must be made for removing this heat to prevent hydrolysis of the alkali metal cyanide and to prevent polymerization of hydrogen cyanide before it is completely neutralized. The copending application of Inman, Serial No. 540,708 filed October 17, 1955, now U.S. Patent No. 2,876,066, dated March 3, 1959, and assigned to the assignee of the present application, discloses how this can be accomplished with conventional coolers in a continuous process. A relatively large amount of aqueous alkali metal cyanide is recirculated through the reactor and sufficient heat is removed with cooling water to prevent the temperature from rising above 50° C. during the reaction. The operation is complicated and requires considerable equipment. Furthermore, the use of cooling water is undesirable because the heat lost increases the amount of heat which must subsequently be supplied to the evaporator. It is possible to operate the evaporator at a sufficiently low temperature to recover heat from the reactor system with a heat exchanger, but it is not economically practical to accomplish any worthwhile amount of heat exchange in this manner. The most economical operation is when the temperature in the reactor system and in the evaporator are only sufficiently low enough to avoid undesirable polymerization and hydrolysis.

It is an object of this invention to provide an improved continuous wet process for producing high quality alkali metal cyanide. Another object is to provide such a process which greatly simplifies control of concentration and temperature in the solutions. A further object is to provide an improved and simplified apparatus for carrying out the process. Other objects will become apparent from the specification, the drawings and the claims.

The process of the present invention comprises adding hydrogen cyanide and aqueous alkali metal hydroxide in separate streams to an aqueous solution of alkali metal cyanide at subatmospheric pressure, evaporating water from said solution under subatmospheric pressure to crystallize the alkali metal cyanide so produced from solution, and separating the crystals from the solution. By reacting the hydrogen cyanide with the alkali metal hydroxide in a solution maintained under reduced pressure, the temperature cannot rise above the boiling point of the solution at the subatmospheric pressure, and heat produced is utilized to evaporate water.

The process can be carried out in an evaporator-crystallizer, thereby eliminating a separate reactor system. The maximum temperature is positively controlled by the pressure, which is maintained at a suitable value in accordance with conventional evaporator practice in the art. Higher temperatures can be used than could be used previously, as a result of the improved control of the process and elimination of hold-up in a reactor system. Hydrolysis of alkali-metal cyanide is a function of time and temperatures as high as 80° C. can be used when the residence time in the evaporator is sufficiently short. However, temperatures below 70° C., and preferably about 60° C., are usually desirable for the production of high quality product.

The hydrogen cyanide can be introduced directly into the evaporator by any means which will provide adequate distribution. It is preferably added to a stream of solution which is circulated from the evaporator through an external conduit and back to the evaporator, since high rates of operation are then possible. The hydrogen cyanide is metered directly into this stream at the desired rate. When operating in this manner the flow of recirculated stream must be sufficient to provide adequate mixing within the evaporator, but distributing equipment, such as those previously disclosed for use in reactor systems, is avoided. The latent heat of the hydrogen cyanide vapor and the heat of reaction supply a large amount of heat to the evaporator, which can constitute a major part of the heat required to evaporate the water added with the alkali metal hydroxide.

The aqueous alkali metal hydroxide can be added directly to the evaporator without provision for distribution when adequate mixing is provided by the boiling solution or the recirculating stream mentioned above. At high rates of operation the aqueous alkali should be distributed uniformly over the top of the solution in the evaporator by means of distributor plates or the equivalent. Preferably this is accomplished by providing one or more sieve plate scrubbing trays in the vapor space near the top of the evaporator, arranged so that vapor leaving the evaporator passes upward through solution having a high concentration of alkali. This avoids loss of hydrogen cyanide in the vapor. A particularly desirable result of this scrubbing is that the vapor condensate contains only a negligible amount of cyanide and can be used directly in other plant operations, if conservation of water is important, or can be discharged to waste without treatment.

The aqueous alkali metal hydroxide should be added at a rate which will maintain an excess of at least 0.2% throughout the solution, and an excess of not over about 3.0% in mother liquor from which crystals formed in the evaporator are to be separated. For satisfactory operation of the process an appreciably greater excess must be avoided for two reasons. It was found, quite unexpectedly, that serious bumping and pounding, severe vibration, and reduction in rate of circulation occurred in the circulating system, used for adding hydrogen cyanide, when attempts were made to use caustic concentrations above about 4%. In addition such an excess would result in too great an amount being carried along with the mother liquor on the crystals, resulting in an undesirable product. It is preferable to operate with an excess of not over 1% of alkali metal hydroxide in the mother liquor, while avoiding any decrease below the minimum of 0.2% excess as a result of the hydrogen cyanide addition. This is readily accomplished by providing a sufficiently high rate of flow in the recirculating stream relative to the rate of hydrogen cyanide addition. Water added with the alkali metal hydroxide must be evaporated, so it is desirable that the solution added contain as high a concentration of the alkali as can be handled conveniently. At normal temperature aqueous sodium hydroxide of about 50% by weight concentration is suitable. When the solution is added hot to prevent solidification before the alkali dissolves in the evaporator solution, sodium hydroxide concentrations as high as 73% or higher are suitable and substantially all of the heat necessary to operate the evaporator can then be supplied by addition of the reactants.

A preferred embodiment of the invention will now be described with reference to the drawings.

Figure 1:
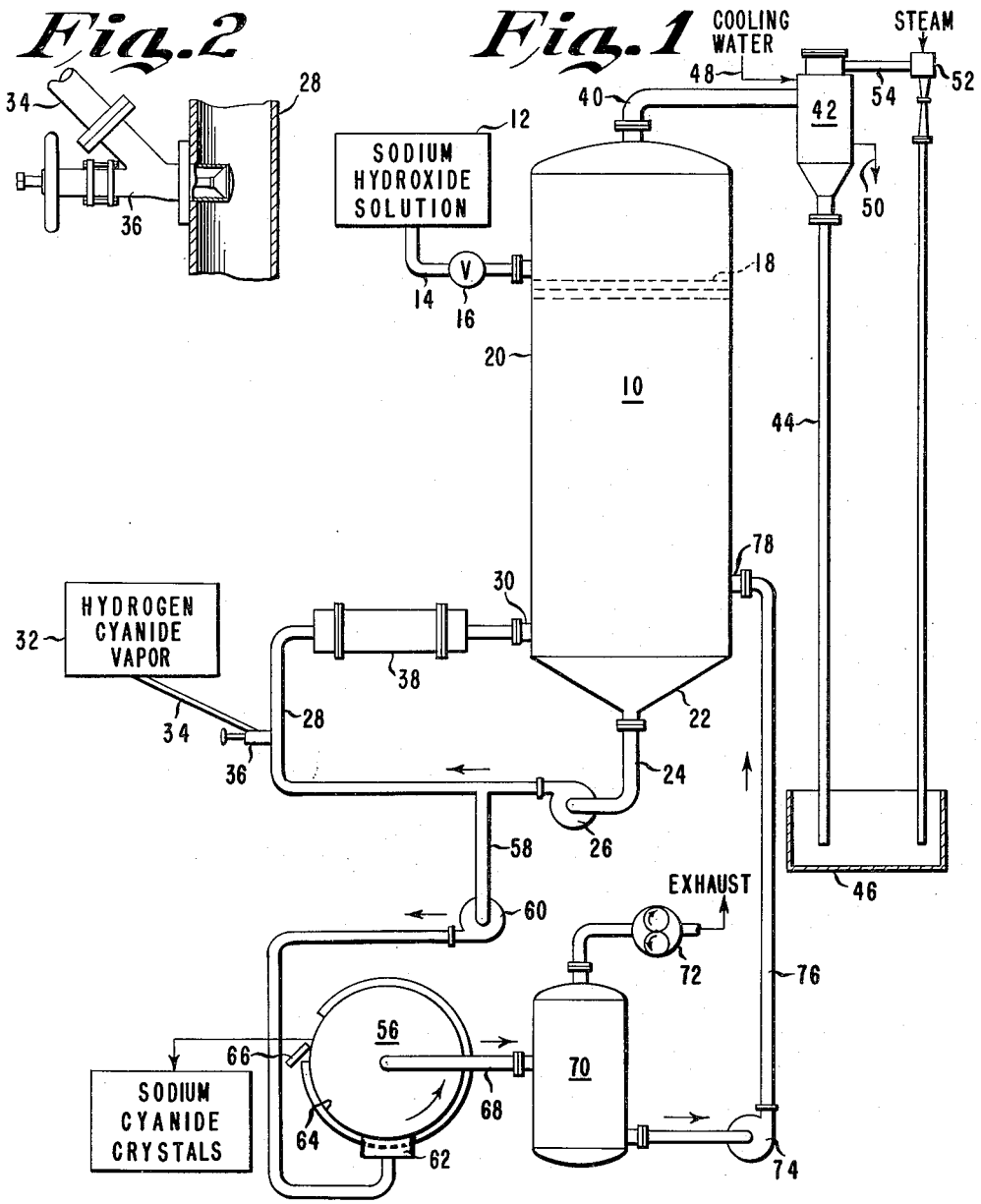
FIGURE 1 is a diagrammatic representation of a suitable combination of apparatus for practicing the invention.

The evaporator-crystallizer 10 is basically a conventional type, previously used in the art for concentrating sodium cyanide solutions to form crystals, equipped with a vacuum system for removing steam to maintain the required low pressure and a circulating system for removing a slurry of sodium cyanide crystals in mother liquor and returning the mother liquor to the evaporator after separation of the crystals. This must be modified for addition to the reactants. Aqueous sodium hydroxide is supplied from a suitable source 12 and flows through pipe 14 into the top of the evaporator, the flow being controlled by suitable means such as valve 16. Sieve plate scrubbing trays 18 are provided near the top of the evaporator to distribute the sodium hydroxide solution uniformly and wash the steam as it leaves the evaporator.

Figure 2:
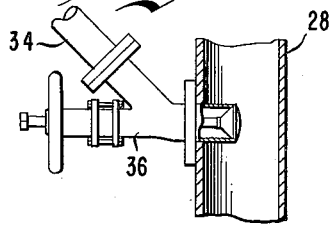
FIGURE 2 is a cross-section of one means for introducing hydrogen cyanide into a stream of sodium cyanide solution.

The evaporator tank has vertical sides 20 and a conical bottom 22 connected to outlet pipe 24. A slurry of sodium cyanide crystals and mother liquor is withdrawn through this pipe to a circulating pump 26, and most of the slurry is pumped through pipe 28 and is returned to the lower part of the evaporator through inlet 30. Hydrogen cyanide vapor from a suitable source 32 is fed through pipeline 34 and a control valve 36, and passes directly into the stream of slurry. The valve is preferably a conventional flush bottom valve mounted on pipe 28 as shown in FIG. 2, in order to avoid clogging of the vapor opening with crystals. The hydrogen cyanide mixes with the stream flowing through pipe 28 and the mixture is discharged into the evaporator. A heater or cooler 38 is located in pipe 28 to control the rate of boiling in the evaporator. It will ordinarily be necessary to supply some heat to the evaporator, in addition to that provided by introducing the reactants, and a heating medium, such as steam, is circulated through heater 38 for this purpose. However, if cooling is desirable, cooling water can be used instead.

The flow of sodium hydroxide solution to the top of the tank is regulated to maintain an excess of 0.2% to 3.0% sodium hydroxide in the solution. Since the hydrogen cyanide is mixed with a boiling solution, the heat of reaction is removed as it is generated by converting liquid water into steam. Accordingly, the temperature of the reaction can be controlled as desired by regulating the pressure in the crystallizer tank.

Vapor conduit 40 leads from the top of the crystallizer tank to a barometric condenser 42 where steam is condensed and the condensate passes down the barometric leg 44 to a hot well 46. Cooling water is passed through the condenser, entering at 48 and leaving at 50, to condense the steam. A conventional steam jet vacuum pump 52, connected to the condenser through pipe 54, is provided to maintain the crystallizer system under 40 to 100 millimeters of mercury absolute pressure, as required.

Sodium cyanide crystals are recovered from the crystallizer slurry with a continuous rotary filter 56. A part of the slurry passing from the bottom of the crystallizer tank through pipeline 26 is diverted through pipeline 58 to a slurry pump 60 and pumped to the filter pan 62. The crystals are deposited on filter drum 64 and are scraped from the drum by doctor blade 66. The mother liquor filtrate drains to the inside of the drum and is withdrawn through conduit 68 to a filtrate tank 70. Vacuum for filtration is provided by pump 72 connected to the top of the filtrate tank. The mother liquor is returned to the crystallizer system by pump 74 in line 76 leading from the filtrate tank to the lower part of the crystallizer tank, through inlet 78.

*Example*

Substantially pure hydrogen cyanide vapor is introduced at a constant rate into a slurry of aqueous mother liquor and crystals of sodium cyanide circulating through pipe 28. The slurry is circulated at a rate, in pounds per hour, which is 230 times the rate of hydrogen cyanide addition. A concentrated aqueous solution of sodium hydroxide is fed over scrubbing trays 18 in the vapor space of evaporator-crystallizer 10 at a rate which maintains an excess of about 2% by weight of sodium hydroxide in the mother liquor leaving the evaporator through pipe 24. The evaporator is operated at an absolute pressure of about 60 millimeters of mercury to maintain the boiling point of this mother liquor at 60°–62° C., and sufficient heat is added to maintain a constant level of mother liquor by vaporizing water introduced with the sodium hydroxide. With an aqueous sodium hydroxide feed of 50% by weight concentration, the latent heat of the hydrogen cyanide vapor and the heat of reaction provide nearly one-third of the heat required and the remainder is added by means of heater 38.

Crystals of sodium cyanide are removed from the evaporator, by means of the recovery system described, at a rate which will maintain about 10% by weight of crystals in the mother liquor slurry. The recovered crystals are then dried to give a product assaying 98.36% by weight of sodium cyanide. The sodium formate content is markedly lower than when separate reactor and crystallizing systems are used, and difficulties with hydrogen cyanide polymerization are avoided. A further advantage over the separate systems is that condensate from the evaporator collected in hot well 46, contains less than 1 part of cyanide per million parts of condensate. This condensate is suitable for direct use in other plant operations, and waste disposal problems are avoided. For comparison, when the sodium hydroxide was added in a reactor system rather than as described, the condensed evaporator vapor contained at least 17 p.p.m. of cyanide.

When the process described in the above embodiment is repeated with an aqueous potassium hydroxide feed, instead of the solution of sodium hydroxide, potassium cyanide is produced in like manner. The process is also suitable for the production of other alkali metal cyanides.

The invention completely eliminates a separate reactor and the accompanying system. In view of the teaching of the prior art it is indeed surprising that the reaction can be conducted satisfactorily without a reactor or special equipment for mixing the reactants. The previously noted difficulties with polymerization or hydrolysis or alkali concentration are not encountered. There is excellent control of the reaction temperature. Since the reaction is conducted in a solution which is maintained at a low boiling point under reduced pressure in the evaporator, the temperature is accurately controlled as desired by adjusting the vacuum. Hence the cooling required with a separate reactor is eliminated and a saving in steam is effected, the heat supplied by the reactants being used as a substantial part of the heat required for evaporating water. A further advantage is that a higher quality product results from the more favorable conditions, including elimination of hold-up in a reactor system in the process of this invention.

Since many different embodiments of the invention may be made without departing from the spirit and scope thereof, it is to be understood that the invention is not limited by the specific illustrations except to the extent defined in the following claims.

What is claimed is:

1. The process for producing alkali metal cyanide which comprises boiling a slurry of alkali metal cyanide crystals in an aqueous solution saturated with alkali metal cyanide in a crystallizer to form crystals of alkali metal cyanide, removing steam from the crystallizer to maintain the solution under a sufficiently low pressure to boil below 70° C., adding concentrated aqueous alkali metal hydroxide directly to said solution in the crystallizer, the alkali metal hydroxide being added at the top of the crystallizer to scrub hydrogen cyanide from said steam; heating the solution and neutralizing alkali metal hydroxide by withdrawing said slurry from the crystallizer, mixing hydrogen cyanide vapor with this slurry at subatmospheric pressure at which said solution boils below 70° C. and returning the slurry to the crystallizer, the amount of added alkali metal hydroxide and hydrogen cyanide being adjusted to maintain an excess of 0.2% to 3.0% of alkali metal hydroxide throughout the solution, removing a slurry of alkali metal cyanide crystals and solution from the crystallizer, filtering the slurry to recover the crystals, and returning the filtrate to the crystallizer.

2. The process for producing alkali metal cyanide which comprises boiling water from a slurry of alkali metal cyanide crystals in an aqueous solution saturated with alkali metal cyanide in a crystallizer, removing steam from the crystallizer to maintain the solution under a sufficiently low pressure to boil below 80° C., adding concentrated aqueous alkali metal hydroxide to said slurry at a rate which replaces water removed as steam, mixing hydrogen cyanide vapor with said slurry to form alkali metal cyanide by reaction with said alkali metal hydroxide at subatmospheric pressure to prevent the temperature from rising above 80° C., the rate of addition being adjusted to maintain an excess of 0.2% to 3.0% of alkali metal hydroxide throughout said saturated solution, removing a slurry of alkali metal cyanide crystals and solution from the crystallizer, recovering crystals from the slurry and returning solution to the crystallizer.

3. A process as defined in claim 2 wherein nearly one-third, at least, of the heat required to boil off the water removed as steam from the crystallizer is supplied by continuous addition of said concentrated aqueous alkali metal hydroxide and hydrogen cyanide vapor and reaction in said saturated solution, and the remainder of the heat required is supplied by a heater.

References Cited in the file of this patent
UNITED STATES PATENTS

| | | |
|---|---|---|
| 1,642,694 | Poindexter et al. | Sept. 20, 1927 |
| 2,365,417 | Kusman | Dec. 19, 1944 |
| 2,616,782 | Cain et al. | Nov. 4, 1952 |
| 2,708,151 | McMinn | May 10, 1955 |
| 2,726,139 | Oliver | Dec. 6, 1955 |
| 2,899,272 | Flach et al. | Aug. 11, 1959 |